United States Patent [19]

E-Ming

[11] Patent Number: 5,063,316

[45] Date of Patent: Nov. 5, 1991

[54] AUTOMATIC DOOR PROTECTIVE REVERSING SWITCH WITH WORM GEAR

[76] Inventor: C. E-Ming, No. 2, Lane 519, Chung Ho Rd., Yung Ho City, Taipei Hsien, Taiwan

[21] Appl. No.: 542,663

[22] Filed: Jun. 26, 1990

Related U.S. Application Data

[63] Continuation of Ser. No. 335,403, Apr. 10, 1989, abandoned.

[51] Int. Cl.[5] .................. F16K 31/50; H01H 3/16; H02K 7/06
[52] U.S. Cl. .......................... 310/83; 49/28; 74/89.14; 200/500; 310/68 B; 310/80; 318/282
[58] Field of Search ............ 49/28; 74/425, 89.14; 192/150; 310/68 B, 69, 80, 83; 318/469, 475, 282; 200/61.39, 61.43, 500, 501

[56] References Cited

U.S. PATENT DOCUMENTS

| | | | |
|---|---|---|---|
| 1,734,500 | 11/1929 | Rogers | 310/83 |
| 2,203,233 | 6/1940 | Panish | 251/129.12 |
| 2,421,178 | 10/1948 | Brownlee | 192/150 |
| 3,930,133 | 12/1975 | Sulzer | 310/68 B |
| 4,092,575 | 5/1978 | Ogishi et al. | 318/282 |
| 4,346,728 | 8/1982 | Sulzer | 74/424.8 VA |
| 4,742,245 | 5/1988 | Yoshida et al. | 307/119 |
| 4,750,294 | 6/1988 | Lafontaine | 49/28 |

FOREIGN PATENT DOCUMENTS

| | | | |
|---|---|---|---|
| 1138906 | 1/1983 | Canada | 49/28 |
| 305939 | 2/1929 | United Kingdom | 192/150 |

Primary Examiner—Steven L. Stephan
Assistant Examiner—D. L. Rebsch
Attorney, Agent, or Firm—Lowe, Price, LeBlanc & Becker

[57] ABSTRACT

An automatic door protective device for returning an overhead door to the open position when it encounters an obstacle as it is closing. The protective device of this invention includes a motor having an output shaft and a driving gear mounted on the shaft. A driven gear is in mesh with the driving gear mounted on a gear shaft which also mounts a worm. A worm wheel is in mesh with the worm which is mounted on a worm wheel shaft, which also mounts a pulley that raises and lowers the door in response to rotation of the output shaft to the motor. The end of the gear shaft is spaced away from a copper leaf spring, and an electrical contact is also provided spaced away from the leaf spring. The spring and the contact are part of an electrical circuit with a signal controller coupled to the motor. When the door encounters an obstacle and the pulley ceases rotation, the torque of the motor causes the gear shaft to displace axially as the worm moves along the worm wheel teeth. The end of the gear shaft forces the leaf spring into electrical contact with the contact, and this completes the circuit to the signal controller, which causes the motor to immediately reverse its direction of rotation of the output shaft.

1 Claim, 1 Drawing Sheet

AUTOMATIC DOOR PROTECTIVE REVERSING SWITCH WITH WORM GEAR

This application is a continuation of application Ser. No. 07/335,403 filed Apr. 10, 1989, now abandoned.

BACKGROUND OF THE INVENTION

The present invention is related to an automatic door protective device which will open the door automatically when the door encounters an obstacle while closing, so as to prevent an accident.

Conventional automatic doors have an induction control system (for example, an ultrasonic wave controlled electric eye) to detect objects so that the door can open and close automatically. However, the area between two sliding doors may be a blind spot to the induction force. The aged, cripples and children are easily hurt in this blind spot, or even an object dropped in this area may be damaged. The present invention is intended to prevent this problem.

SUMMARY OF THE INVENTION

The present invention provides an automatic door protective device which includes a driving gear mounted on a motor, a driven gear engaged with the driving gear and coaxially connected with a worm which is further engaged with a worm wheel, and a generator controller. When a resistance is encountered during closing of an automatic door due to an obstacle in the way, the worm will be continuously driven to push a leaf spring to contact a power source so as to produce a signal to open the door. When the motor is stopped during closing of the automatic door, the relay for the generator controller may be series connected to the contact point of power to produce a signal to open the door automatically.

DETAILED DESCRIPTION OF THE PREFERRED EMBODIMENTS

Figure 1:
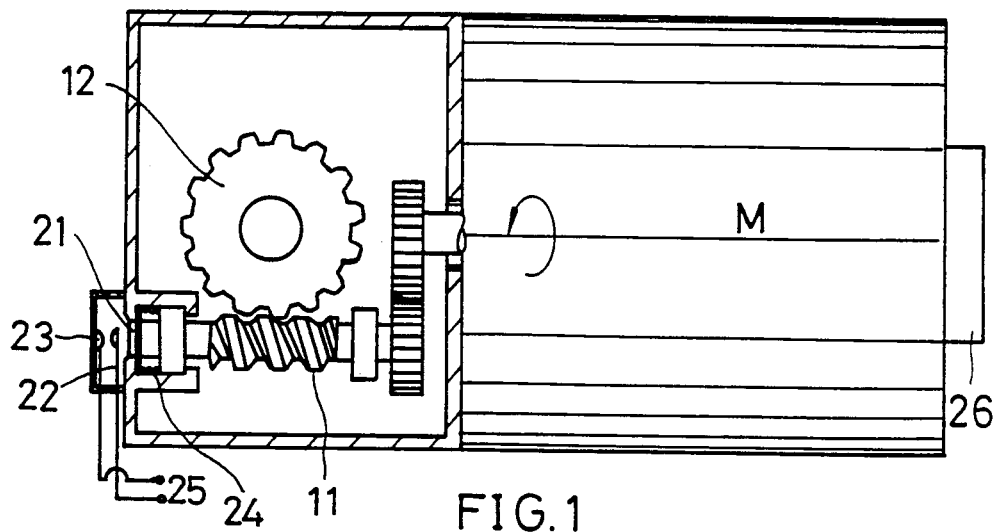
FIG. 1 is a structural sectional view of the present invention.
Figure 2:
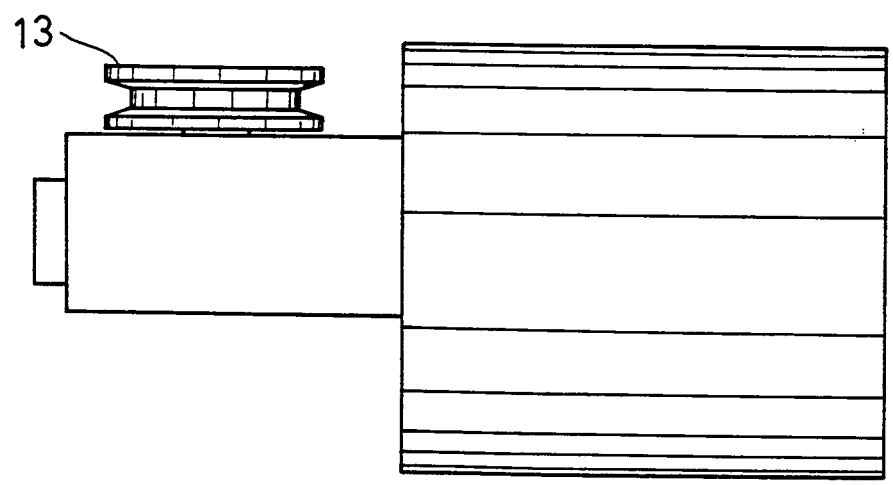
FIG. 2 is a plan view of the present invention.
Figure 3:
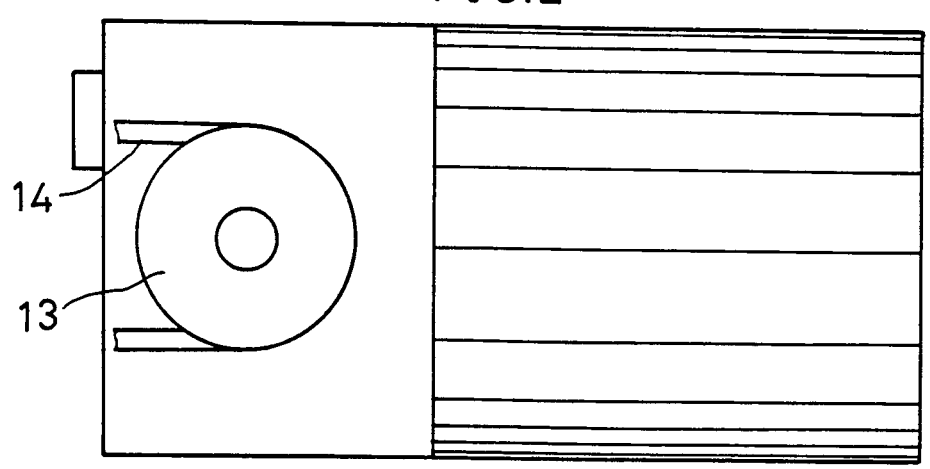
FIG. 3 is another plan view of the present invention.

Referring to the annexed drawings, a motor M is connected to a worm 11 which is engaged with a worm wheel 12 to transmit the driving power from the motor M to a belt pulley 13, to further control the opening and closing of an automatic door. When the motor M is driven to rotate clockwise, according to the direction indicated in FIG. 1, the worm wheel 12 will be driven to rotate counter-clockwise, to further drive the belt pulley 13 to make clockwise rotation as shown in FIG. 3, so as to drive the associated automatic door toward a closed position. On the other hand, when the worm wheel 12 is driven by the motor M to rotate clockwise, the automatic door will be simultaneously driven back to an open position. An insulator 21 is positioned at the front end of the worm 11, and a copper leaf spring 22 and a contact point 23 are respectively connected with a signal conductive wire 25 and arranged at the front of the worm 11. The signal conductive wires 25 of the copper leaf spring 22 and the contact point 23 are connected in parallel to a relay which is set in a generator controller 26 and connected with the signal conductive wires of the original automatic door to form a loop.

When the copper leaf spring 22 and the contact point 23 are passed into contact with each other, a signal will be produced to change the motion of the motor M from clockwise to counter-clockwise rotation, that is, upon the contact of the leaf spring 22 with the contact point 23 signal is instantly induced to drive the motor M to rotate counter-clockwise (in a reverse direction against the arrow indicated in FIG. 1) so as to drive the automatic door from closing movement to an opening movement. There is also provided a cushioning mechanism 24 to constantly keep the worm 11 in a normal position during normal operation. If the automatic door encounters an object during closing (any person or article in the path of the double sliding doors of the associated automatic door), the belt pulley 13 which is rotating counter-clockwise will stop while the worm 11 is still driven by the motor M and therefore, the worm 11 will be pushed ahead to move the leaf spring 22 to touch the contact point 23 to trigger the relay of the generator controller 26, to provide a signal to the motor M to change its revolving direction. Thus, the automatic door will be instantly driven backward from its closing movement to an opening movement. This process is similar to the process of outdoor induction of an automatic entrance door to automatically open. Because the time delay process is completed very quickly accidents can be prevented.

When the induction control system of an automatic door fails to work, the door will be unable to be opened, and it will require a maintenance engineer to repair the door. If the automatic door is equipped with the present invention, the door still can be opened easily if the induction control system is out of order. One may manually push the door open. The push force will drive the belt pulley 13 to produce the counter-clockwise revolving force required to drive the worm 12 clockwise. The push force will drive the worm 11 forward to move the leaf spring 22 to contact the contact point 23 so as to let the relay of the motor generator controller 26 trigger to produce a signal the same as the signal induced by the induction control system of the automatic door. The motor will then be driven to open the door.

If the motor M is stopped during closing of the automatic door due to interference with an object or a person, the voltage signal from the coaxial generator, which is arranged behind motor M, will be amplified and become useless and unable to trigger the relay. At this moment, the contact point of the relay may be series connected with power supply to produce an induction signal to drive the automatic door open again, to release the object or person. If the generator voltage signal amplifier controller is not used, the contact point of the coaxial eccentric switch of the motor M may be connected to the leaf spring 22 to trigger the relay to drive the automatic door open again.

In conclusion, the present invention is to provide an economic and mechanical type automatic door protective device for an automatic door to prevent accidents and to serve as a temporary inductor to open the door when the induction control system of the door fails.

I claim:
1. An automatic door protective device comprising:
a motor having an output shaft; a driving gear mounted on said shaft; a driven gear shaft and driven gear thereon engaging said driving gear; a worm mounted on said gear shaft coaxially with said driven gear; a worm wheel shaft and a worm wheel mounted thereon engaging said worm; pul- ley means coaxially mounted on said wheel shaft for opening and closing said door responsive to rotation of said output shaft; a leaf spring disposed a predetermined distance from the end of said gear shaft opposite said driven gear; and electrical contact disposed adjacent and normally spaced a predetermined distance away from said leaf spring; an insulator disposed between the end of said gear shaft and said leaf spring; cushion means supporting said gear shaft and normally urging said worm into engagement with said worm wheel; signal means electrically coupled between said left spring, said electrical contact and said motor for reversing rotation of said motor when said door encounters an obstacle forcing said pulley means to stop rotation of the wheel shaft and worm wheel whereby the rotation of said motor will axially displace said worm and gear shaft until the end thereof forces said leaf spring into electrical engagement with said electrical contact closing an electrical circuit.

* * * * *